US012246915B2

(12) United States Patent
Burr

(10) Patent No.: US 12,246,915 B2
(45) Date of Patent: Mar. 11, 2025

(54) DIRT CLEANING, COLLECTION AND CONTAINMENT DEVICE

(71) Applicant: CLINISEAL LTD, London (GB)

(72) Inventor: Alan Graham Burr, Macclesfield (GB)

( * ) Notice: Subject to any disclaimer, the term of this patent is extended or adjusted under 35 U.S.C. 154(b) by 333 days.

(21) Appl. No.: 17/790,724

(22) PCT Filed: Jan. 25, 2021

(86) PCT No.: PCT/EP2021/025028
§ 371 (c)(1),
(2) Date: Jul. 3, 2022

(87) PCT Pub. No.: WO2021/151622
PCT Pub. Date: Aug. 5, 2021

(65) Prior Publication Data
US 2023/0058613 A1 Feb. 23, 2023

(30) Foreign Application Priority Data
Jan. 28, 2020 (GB) ..................................... 2001195

(51) Int. Cl.
*B65F 1/06* (2006.01)
*B65B 7/00* (2006.01)
(Continued)

(52) U.S. Cl.
CPC ................ *B65F 1/062* (2013.01); *B65B 7/00* (2013.01); *B65F 1/04* (2013.01); *B65F 1/1415* (2013.01);
(Continued)

(58) Field of Classification Search
CPC .......... B65F 1/062; B65F 1/04; B65F 1/1415; B65F 1/14; B65F 1/12; B65F 2210/1023;
(Continued)

(56) References Cited

U.S. PATENT DOCUMENTS 4,253,691 A * 3/1981 Liu ....................... E01H 1/1206 294/1.4
7,226,098 B1 * 6/2007 Moreira ................ E01H 1/1206 294/1.4
(Continued)

*Primary Examiner* — Stephen A Vu

(57) ABSTRACT

A surface cleaning device designed for the safe collection and encapsulation of potentially harmful waste. It addresses the challenge of hygienically collecting waste from surfaces while preventing exposure to hazardous materials. The device features a hollow chamber (1) with an opening equipped with a first actuator and scooping member (5) that efficiently collects surface waste into disposable containment tube material (10) drawn over the chamber opening. A rotatable containment tube store (3) twists the tube around a pinch point created by the scooping actuator (5) during extension, sealing the waste into distinct compartments and ensuring containment. A second actuator (7) moves the disposable containment tube from the store. Repeat actions create multiple compartments within the tube, enhancing safety and efficiency. The primary use of this invention is in environments requiring the safe cleaning and disposal of hazardous waste, effectively isolating waste into sealed sections and minimizing risks associated with direct handling.

15 Claims, 4 Drawing Sheets

(51) Int. Cl.
*B65F 1/04* (2006.01)
*B65F 1/14* (2006.01)
*E01H 1/12* (2006.01)

(52) U.S. Cl.
CPC . *B65F 2210/1023* (2013.01); *B65F 2210/167* (2013.01); *B65F 2210/168* (2013.01); *B65F 2250/105* (2013.01); *B65F 2250/1143* (2013.01); *E01H 1/1206* (2013.01); *E01H 2001/1246* (2013.01); *E01H 2001/128* (2013.01)

(58) Field of Classification Search
CPC .......... B65F 2210/167; B65F 2210/168; B65F 2250/105; B65F 2250/1143; B65B 7/00; E01H 1/1206; E01H 1/12; E01H 2001/1246; E01H 2001/128
See application file for complete search history.

(56) References Cited

U.S. PATENT DOCUMENTS

| | | | | |
|---|---|---|---|---|
| 7,293,810 | B2 * | 11/2007 | Lopoukhine .......... | E01H 1/1206 294/1.4 |
| 9,790,654 | B2 * | 10/2017 | Gordon ..................... | A47L 5/12 |
| 10,851,506 | B1 * | 12/2020 | Sabella ................. | E01H 1/1206 |
| 2004/0100108 | A1 | 5/2004 | Cappellano et al. | |
| 2004/0188443 | A1 | 9/2004 | Perkitny et al. | |
| 2014/0152033 | A1 | 6/2014 | Wilson | |

* cited by examiner

DIRT CLEANING, COLLECTION AND CONTAINMENT DEVICE

FIELD OF THE INVENTION

The present invention relates to the collection, containment and cleaning of dirt or fluid including substances hazardous to health.

BACKGROUND TO THE INVENTION

The safe containment and cleaning of dirt or fluid, particularly substances hazardous to health, present a challenge with potentially serious environmental health risks to both the cleaner and others.

A spill of bodily fluids such as faeces, sputum or blood requires a cleaning process that contains the spill to prevent any dangerous particles from infecting other persons.

For example, Norovirus is associated with acute infectious nonbacterial gastroenteritis, is found in the bodily fluid of an infected person and contact can prove fatal in vulnerable age groups. Norovirus is one of the commonest causes of gastrointestinal infections.

Current equipment in use include: absorbent substances; disinfectants; cleaning agents; disposable cloths and plastic bags; masks; gloves; mop and a bucket, etc.

Soiled diapers, surgical dressings and other contaminated materials also require safe containment and disposal.

Risk to health not only occurs during the cleaning process, but also afterwards when cleaning the equipment and disposing of the waste.

U.S. Pat. No. 4,869,049A discloses apparatus for packaging a series of objects respectively in individual packages distributed along a length of flexible tubing according to the preamble of claim 1.

U.S. Pat. No. 3,446,525A discloses a pickup device for grasping and transporting unclean material such as animal droppings, wherein a disposable compliant wrapping means is received and held on said pickup according to the preamble of claim 1.

Example embodiments of the present invention aim to address at least one of the issues identified above, or related issues.

STATEMENT OF INVENTION

A first aspect of the invention provides a cleaning device comprising: a hollow main body having a first end and a second end, wherein the hollow body defines a chamber between its first end and its second end, and wherein the chamber has an opening at the first end, the edges of the opening defining a plane; a first actuator comprising a scooping member, wherein the first actuator is movable between an extended position and a retracted position, wherein when the first actuator is in the retracted position, substantially all of the scooping member is disposed proximate the edge of the chamber opening, and wherein when the first actuator is in the extended position, at least a part of the scooping member is disposed proximate the centre of the chamber opening; a second actuator, at least partly within the chamber, comprising a holding member, wherein the second actuator is movable; and a store of disposable containment tube material, from which, in use, disposable containment tube material can be drawn by a pulling force exerted on an already exposed portion of the stored containment tube material; wherein, the holding member is configured to grip, in use, a portion of the disposable containment tube material.

The first actuator may comprise two extendable and retractable bridging members attached at their proximal ends to opposing positions proximate the chamber opening, and the scooping member may comprise two flexible elongate members attached to respective distal ends of the bridging members.

When the first actuator is in the extended position, the two flexible elongate members may be held parallel and proximate to one another, their respective centres being held proximate to the centre of the chamber opening.

A rim may extend from the chamber opening, and when the first actuator is in the retracted position, the two flexible elongate members may be held against the rim.

The first actuator may alternatively comprise three elongate scooping members having respective proximal ends and distal ends; and the proximal ends may be rotatably connected proximate the edge of the chamber opening, spaced at substantially equal intervals, the axis of rotation being perpendicular to the plane defined by the chamber opening.

In that case, when the first actuator is in the extended position, the distal ends of the three scooping members may be held proximate the centre of the chamber opening. A rim may extend from the chamber opening, in which case when the first actuator is in the retracted position, the scooping members are held against the rim.

The second actuator may move in a proximal direction and in an opposite, distal direction, wherein the distal direction is from the second end to the first end, and the proximal direction is from the first end to the second end.

The store of disposable containment tube material may be a cassette, replaceably attached to the outside of the main body.

The main body may be cylindrical and at least one of: a portion of the main body proximate its first end; the first actuator; and/or the store of disposable containment tube material may be rotatable with respect to the second actuator.

The scooping member may have a low friction distal face held substantially flush with the edge of the plane defined by the chamber opening.

The disposable containment tube material may be formed of a plurality of layers, the outer surface of the outermost layer being abrasive or high-friction. The outermost layer of the disposable containment tube material may be impermeable to liquid. The innermost layer of the disposable containment tube may be absorbent to liquid. The innermost layer of the disposable containment tube may be impregnated or coated with one or more of: cleaning agents; antibacterial agents; biological agents and/or chemical agents.

The disposable containment tube may be divided into lengthwise sections, each section being closable and/or sealable at each end so as to form separate compartments within the tube. The sections may be closable or sealable by means of one or more of: twisting; tying; heat activated adhesive; integral drawstring; integral elastomeric material.

The disposable containment tube may comprise a layer of polythene film bonded to a series of open ended tubes, spaced apart and at intervals along the length of the polythene film, and each of the open ended tubes may comprise absorbent material of a non-woven viscose and polyester blend.

The first and second actuators may be identical and interchangeable.

A second aspect of the invention provides a method of controlling a cleaning device of the first aspect, wherein the cleaning device comprises: a hollow main body having a first end and a second end, wherein the hollow body defines a chamber between its first end and its second end, and wherein the chamber has an opening at the first end, the edges of the opening defining a plane; a first actuator comprising a scooping member, wherein the first actuator is movable between an extended position and a retracted position, wherein when the first actuator is in the retracted position, substantially all of the scooping member is disposed proximate the edge of the chamber opening, and wherein when the first actuator is in the extended position, at least a part of the scooping member is disposed proximate the centre of the chamber opening; a second actuator, at least partly within the chamber, comprising a holding member, wherein the second actuator is movable; and a store of disposable containment tube material, from which, in use, disposable containment tube material can be drawn by a pulling force exerted on an already exposed portion of the stored containment tube material; wherein, the holding member is configured to grip, in use, a portion of the disposable containment tube material; the method comprising: grasping the closed or sealed end of the disposable containment tube in the holding member of the second actuator; moving the second actuator, drawing a length of disposable containment tube into the chamber to form a compartment open at the chamber opening; maneuvering the opening of the chamber to abut a surface to be cleaned: moving the first actuator from the retracted position to the extended position, so as to close the compartment of the disposable containment tube; performing a compartment sealing operation; maneuvering the opening of the chamber so that it no longer abuts the surface to be cleaned; moving the first actuator from the extended position to the retracted position; and moving the second actuator, drawing a further length of disposable containment tube into the chamber.

The compartment sealing operation may comprise rotating at least one of: a portion of the main body proximate its first end; the first actuator; and/or the store of disposable containment tube material with respect to the second actuator.

The compartment sealing operation may comprise heating a section of the disposable containment tube.

The step of moving the second actuator, drawing a further length of disposable containment tube into the chamber, may comprise: moving the second actuator far enough to ensure that a portion of the interior surface of the disposable containment tube that made contact with the surface to be cleaned is drawn entirely into the chamber.

The method may further comprise the steps of: when the chamber is full, or the disposable containment tube store is exhausted, placing the chamber opening proximate a waste disposal unit; sealing or closing the compartment of the disposable containment tube; cutting, if required, the sealed or closed compartment to sever it from the store of disposable containment tube; moving the first actuator into the retracted position; moving the second actuator; releasing the disposable containment tube from the second actuator such that the used disposable containment tube is transferred to the waste disposal unit.

BRIEF DESCRIPTION OF DRAWINGS

The invention will be described, by way of example only, with reference to the drawings, in which.

DETAILED DESCRIPTION

Figure 1:
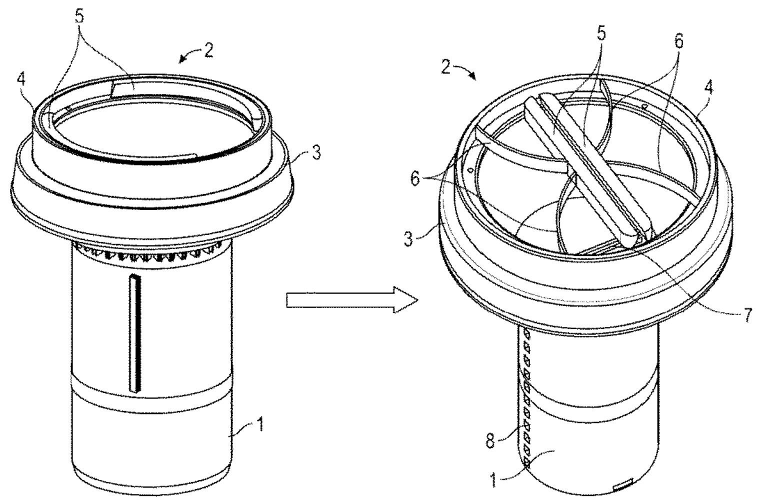
FIG. 1 depicts a cleaning and containment device in an open configuration and in a closed configuration according to a first embodiment of the invention.

The invention relates to a device for cleaning, collecting and containing dirt. In several preferred embodiments, the device comprises a main body with a cleaning region. In use, the cleaning region is generally directed to the floor, or another surface to be cleaned, and presents an opening to the main body, so that the dirt is scooped through the opening of the cleaning region into the main body.

The device may be mounted on or incorporated into one of: a trolley; a vehicle; a remote controlled vehicle; a semi-autonomous vehicle; an autonomous vehicle. The trolley may or other vehicle may be configured to automatically raise and lower the cleaning region of the device during operation.

In order to prevent contact with the dirt once it has been scooped up, the cleaning region and the interior of the main body are covered by a disposable containment tube. During a scooping operation, a length of the disposable containment tube is drawn through the opening in the cleaning region into the main body, from a store outside the main body, to form one of a series of separate chambers in which the dirt is contained.

The scooping operation is performed by a scooping actuator at the cleaning region. The scooping actuator may be formed of a plurality of moving members which move from the outer rim of the opening in the cleaning region to the centre of the opening in the cleaning region, while engaged (e.g. by friction) with a portion of the exterior surface of the disposable containment tube, thus drawing said portion of the disposable containment tube from its store into the centre of the opening of the cleaning region. During this operation, the opening in the cleaning region becomes covered by a portion of the interior surface of the disposable containment tube. This movement of the portion of the interior surface of the cleaning tube across the surface to be cleaned as it is drawn from the edge of the opening to the centre of the opening has a cleaning effect on the surface similar to that created by rubbing a cloth over the surface to be cleaned.

Inside the main body is an attachment member. This holds the first end of the disposable containment tube, so that the interior of the disposable containment tube from the attachment member to the periphery of the opening in the cleaning region forms an open chamber similar to a bag.

The first end of the disposable containment tube is closed before being attached to or held by the attachment member. The closure may be by tying, heat sealing, integral draw-string or any other suitable method as would be apparent to the skilled person.

The attachment member is actuable to move towards and away from the cleaning region. During a scooping operation, the attachment member moves away from the cleaning region in order to draw the length of disposable containment tube pulled from the store during the previous scooping operation into the main body. The distance moved by the attachment member during a scooping operation corresponds to the depth of one of the separate chambers containing dirt into which the disposable containment tube is formed. When the scooping operation is complete, a newly formed separate chamber is held within the main body, temporarily held closed by the scooping actuator.

The newly formed separate chamber is then sealed. This can be done in a number of ways. For example, the disposable containment tube could: have tie cords, either integral or external, at intervals along its length; have sections which become adhesive in reaction to heat at intervals along its length; be elastically biased in a closed configuration at intervals along its length; have a bonding substances such as an adhesive at intervals along its length; have a mechanical fastener or clip provided separately and optionally applied mechanically by the device; or be knotted manually or automatically when closed. In a preferred embodiment, the disposable containment tube store is rotatable with respect to the attachment member, causing the disposable containment tube to twist about the 'pinch point' created by the scooping actuators when extended to the centre of the opening in the cleaning region.

When the separate chamber is sealed, the cleaning region is lifted slightly from the surface being cleaned, and the scooping actuators retract to the edge of the opening in the cleaning region and the attachment member moves farther from the cleaning region in order to:

Draw the sealed separate chamber into the main body;

Form a new unsealed chamber in the main body to receive more scooped material at the next operation; and Maintain the tension in the disposable containment tube.

The operation can then be repeated as required. It is important to design the attachment means so that it is strong enough and secure enough in its position to remain in place under the shifting weight of dirt and debris sealed in the chambers.

At any point during operation, or at the end of use to clean the device, the device is configured and operated to:

Lift the cleaning region slightly from the surface being cleaned;

With the scooping actuators in the retracted position, move the attachment means away from the cleaning region far enough to ensure that the portion of the interior surface of the disposable containment tube that was used as a cloth during the previous scooping operation, and is therefore contaminated, is withdrawn into the main body.

When the main body is full, or the disposable containment tube store is exhausted, the final separate chamber is sealed according to a method described above, preferably tied with a knot, the scooping actuators are retracted, and then the attachment member is moved to its position closest to the cleaning region, where it is configured to open, releasing the end of the disposable containment tube. This operation is preferably performed with the cleaning region opening held over a waste disposal unit, such as a bin.

FIG. 1 shows an embodiment of the invention in two configurations, first with the scooping actuators open or retracted, and then with the scooping actuators closed, or extended. The device comprises a main body 1, which in the depicted embodiment is a hollow cylinder open at least a first end 2.

Although these features are not all depicted, the body of the device may also comprise one or more of: a closable lid; a hamper; a side door (FIGS. 4 and 5); tube collection chamber (FIGS. 4 and 5); window(s); a foot pedal; a remote operating switch; an extending arm (to form a telescopic handle for the device); a diaphragm (from the store to form a pinch point for twisting and sealing each compartment); wall(s); internal wall(s) of conical shape; a cutter to cut the tube; and/or sensor(s).

The hollow cylinder may be made of plastics, but may be made from silicone. It may be made from an antibacterial or antimicrobial material or have a coating of antibacterial or antimicrobial material or substance.

Disposed proximate the first end 2, around the outside of the main body 1, is a disposable containment store tube 3, which in the depicted embodiment is an annular cassette. The disposable containment tube can be stored in the cassette or other container, arranged in pleats, flat or rolled. Other arrangements may be selected, as would be apparent to the skilled person.

A rim 4 extends axially from the first end 2 of the main body 1. The distal edge of the rim defines a circular cleaning region.

Scooping actuators are provided inside the rim 4. In the embodiment depicted in FIG. 1, the scooping actuators comprise two flexible elongate members 5, preferably formed of rubber, but other flexible and/or resiliently biased materials may be selected, which bend to follow the curve of the rim 4 when retracted and return to substantially straight forms when extended.

The flexible elongate members 5 are connected to the rim 4 by means of resilient bridging members 6. These are preferably formed of plastic or metal. The extension and retraction of the scooping actuators may be effected by motor or linear actuator, and may be an automatic sequence, in response to a timer and/or sensing the proximity to the cleaning region of a surface to be cleaned, or triggered by a remote control or switch.

Each flexible elongate member 5 has a distal surface which is flush with the distal edge of the rim. This is preferably textured or otherwise constructed to have a relatively low coefficient of friction. The sides of the respective flexible elongate members 5 which face the centre of the cleaning region, and thus face each other, are preferably textured or otherwise constructed to have a relatively high coefficient of friction in order to grip the exterior surface of the disposable containment tube.

These same sides may be slanted so that the angle between them and the respective distal surfaces is acute, to increase the scooping efficiency of the scooping actuators.

Inside the main body 1 is attachment member 7. This may comprise two elongate planar members having opposing surfaces held together by two opposing narrow tracks 8 in the interior surface of the main body 1, into which their ends are slidably inserted. In use, a first end of a disposable containment tube is tied in a knot or otherwise sealed closed, and held in frictional engagement between the two opposing surfaces.

Alternatively, a clip comprising a sprung hinge about one edge may serve as an attachment member. Other attachment members suitable for holding a sealed tube end and movable towards and away from the cleaning region will be apparent to the skilled person.

A pulley system controlled by a motor, which may be driven by an automatic control system based on a sensed position of the cleaning region with respect to a surface to be cleaned, and/or a timed or automatic sequence, or may be controlled by a remote switch, may be used to cause the movement of the attachment means towards and away from the cleaning region.

The cassette 3 may be rotatable about the main body 1. The rotation may be actuable by a motor, and may be automatic, part of an automatic sequence, or remotely controlled. In this way, the stored disposable containment tube will rotate with respect to the pinch point caused by the extended scooping actuator, thus sealing the chamber formed by the disposable containment tube inside the main body.

The store may be axially movable with respect to the main body of the device as well as rotatable. It may be configured to move towards or away from the cleaning region as well as rotate when closing the chamber.

The twisting of the disposable containment tube may be effected by the rotation of a component other than the store. For example, the distal end of the device may rotate as a whole, or the rim of the device. The attachment means may rotate, so that the disposable containment tube is rotated from its closed end rather than its open end. It may be rotated about both its closed end and its open end, in opposite directions, in order to twist it more rapidly. The inventor has found that two or three complete revolutions are sufficient to provide the necessary closure by twisting.

Figure 2:
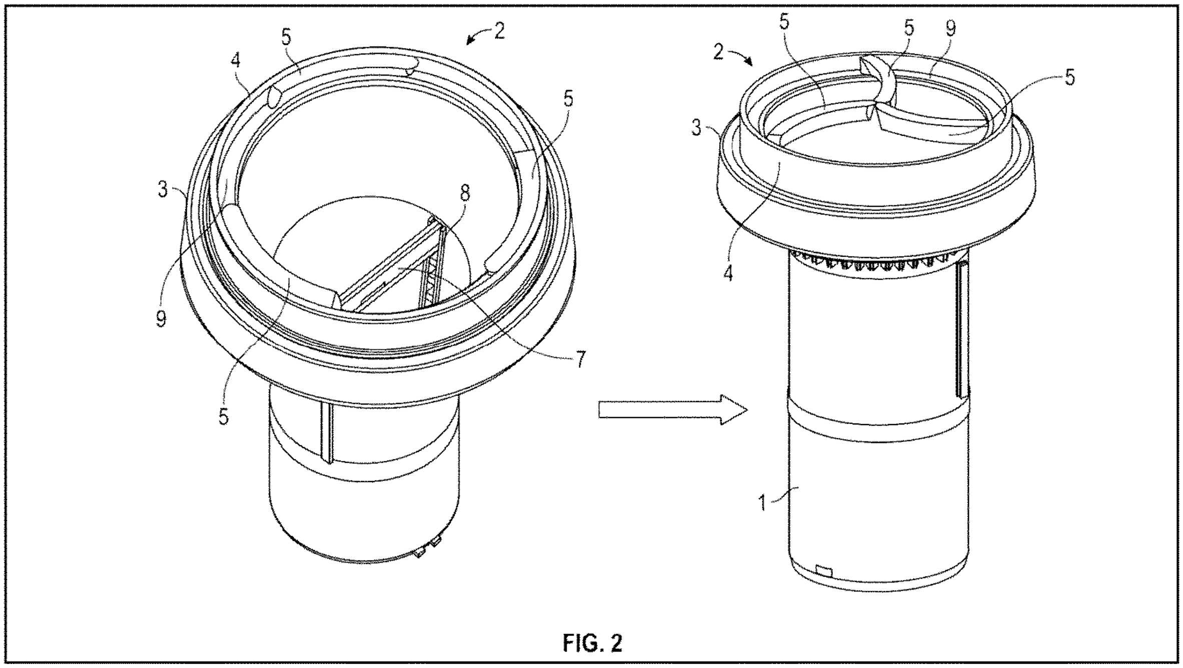
FIG. 2 depicts a cleaning and containment device in an open configuration and in a closed configuration according to a second embodiment of the invention.

FIG. 2 depicts a similar device with a different scooping actuator.

Three arcuate members 5 are supported by an annular lateral protrusion 9 from the proximal end of the rim 4. When they are retracted, their convex sides lie substantially flush with the internal surface of the rim 4.

When they are extended, rotated about respective first ends, their second ends meet or approach one another close to the centre of the cleaning region. Their distal faces are substantially flush with the distal edge of the rim 4.

The rotation of the arcuate members 5 may be effected by motors, controlled either remotely, or automatically by a timing system and/or in response to a sensor detecting the proximity of a surface to be cleaned.

The angle between the concave face and the distal face of each arcuate member 5 may be acute, to aid scooping. The angle between the second end and the distal face of each arcuate member 5 may also be acute, to aid scooping.

The arcuate members may be made of rubber, plastics, silicone or other suitable material.

The distal face is preferably smooth, or is coated or constructed to have a relatively low coefficient of friction.

The concave face and second end are preferably rough, or are coated or constructed to have a relatively high coefficient of friction, in order to better grip the disposable containment tube.

Figure 3:
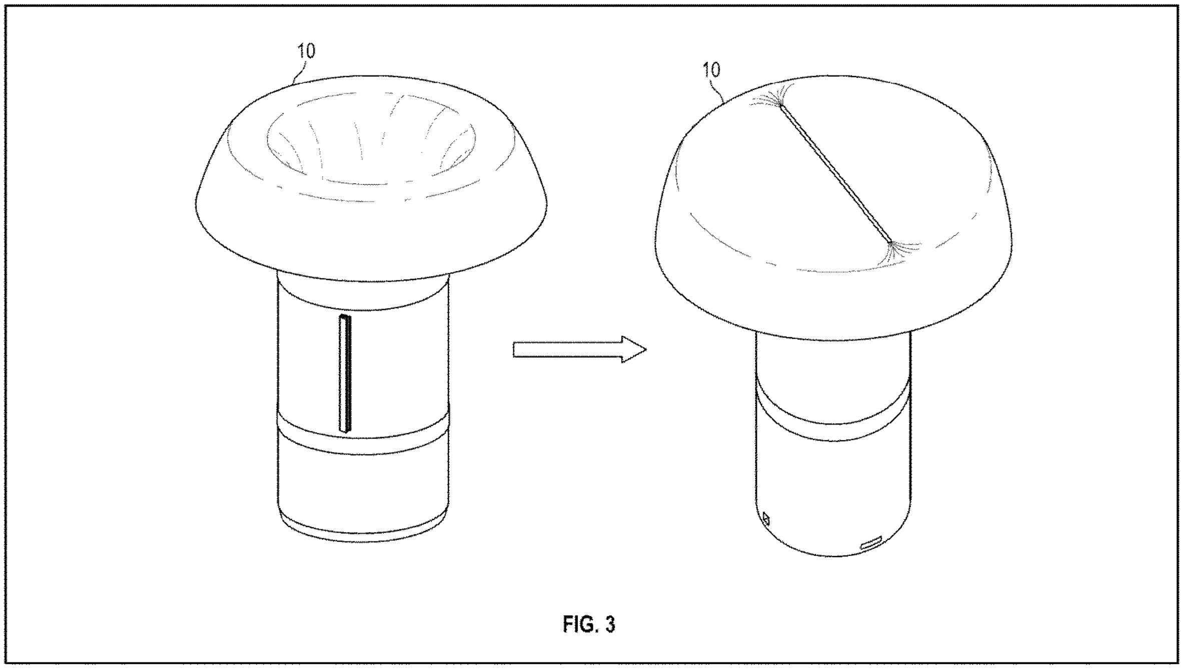
FIG. 3 depicts a cleaning and containment device to which a waste disposal tube has been fitted, in an open configuration and in a closed configuration, according to an embodiment of the invention.

FIG. 3 depicts a device of the first embodiment detailed above, with a length of disposable containment tube 10 drawn from the proximal rim of the store 3 over the rim 4 of the device and through the opening in the cleaning region. The end of the disposable containment tube 10 is secured by the attachment member (not shown in this figure). To the left of the figure, the flexible elongate members 5 of the scooping actuator are retracted. To the right of the figure, the flexible elongate members 5 of the scooping actuator are extended. The extended flexible elongate members 5 have pulled a length of the disposable containment tube 10 from the store 3 so that the cleaning region is substantially covered by the surface of the disposable containment tube 10.

The disposable containment tube may be formed of multiple layers. It may have an abrasive outer surface to aid the removal of dirt from the surface to be cleaned. It is preferably impermeable and/or non-porous, or it may be absorbent, for the removal of liquid from the surface to be cleaned. It may be biodegradable, compostable, burnable, and/or recyclable. It may be elastomeric, and should be sufficiently resilient to clean and store dirt, debris and liquid. It may comprise a filter layer. It may be coloured, for example to indicate hazardous waste using conventional colours.

The disposable containment tube may be impregnated with or have layers formed of or impregnated with cleaning agents, antibacterial agents, biological agents and/or chemical agents.

The disposable containment tube may isolate the main body of the device from the dirt and/or fluid with which it comes into contact.

In a preferred embodiment, the disposable containment tube comprises one layer of polythene film bonded to a series of open ended tubes, spaced apart and at intervals along the length of the polythene film, wherein each tube comprises absorbent material of a non-woven viscose and polyester blend. In this embodiment, each open ended tube is less than the length of tube required to form one chamber. Each separate chamber is sealed by twisting or tying the disposable containment tube at a section comprising only the single layer of polythene film. In this embodiment, the main body of the device is only ever in contact with the polythene film, and each chamber contains the absorbent material.

In other embodiments, the disposable containment tube may be made from a polylactic acid (PLA) compostable/biodegradable material.

Figure 4:
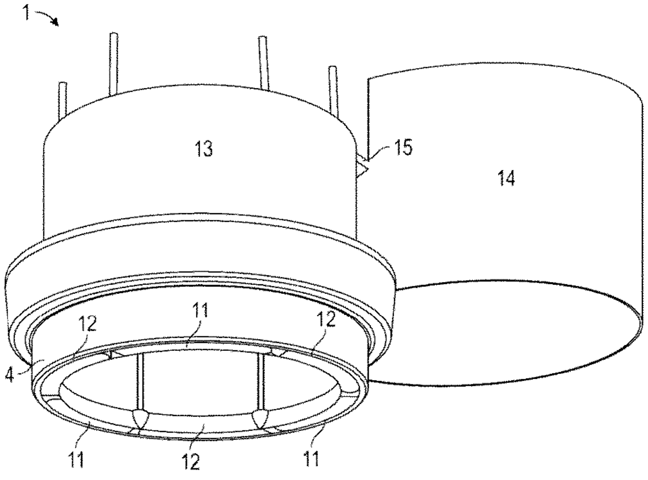
FIG. 4 depicts a cleaning and containment device in an open configuration according to a third embodiment of the invention.

FIG. 4 depicts an alternative embodiment having two actuators at the rim 4, each one comprising three arcuate members, the three arcuate members 11 of the first actuator alternating around the rim 4 with the three arcuate members 12 of the second actuator.

As in the second embodiment, when the arcuate members 11, 12 are retracted, their convex sides lie substantially flush with the internal surface of the rim 4. When they are extended, rotated about respective first ends, their second ends meet or approach one another close to the centre of the cleaning region. In the scooping actuator position, their distal faces are substantially flush with the distal edge of the rim 4.

The rotation of the arcuate members 11, 12 may be effected by motors, controlled either remotely, or automatically by a timing system and/or in response to a sensor detecting the proximity of a surface to be cleaned.

The angle between the concave face and the distal face of each arcuate member 11, 12 may be acute, to aid scooping. The angle between the second end and the distal face of each arcuate member 11, 12 may also be acute, to aid scooping.

The arcuate members 11, 12 may be made of rubber, plastics, silicone or other suitable material.

The distal face is preferably smooth, or is coated or constructed to have a relatively low coefficient of friction.

The concave face and second end are preferably rough, or are coated or constructed to have a relatively high coefficient of friction, in order to better grip the disposable containment tube.

The main body 1 is divided into two cylindrical compartments, positioned adjacent to one another. The first cylindrical compartment 13 houses, in use, the open separate chamber formed by the disposable containment tube. The second cylindrical chamber 14 houses, in use, sealed separate chambers of the disposable containment tube from previous operations of the device. The two chambers 13, 14 are connected by a pivoting ramp device 15.

Figure 5:
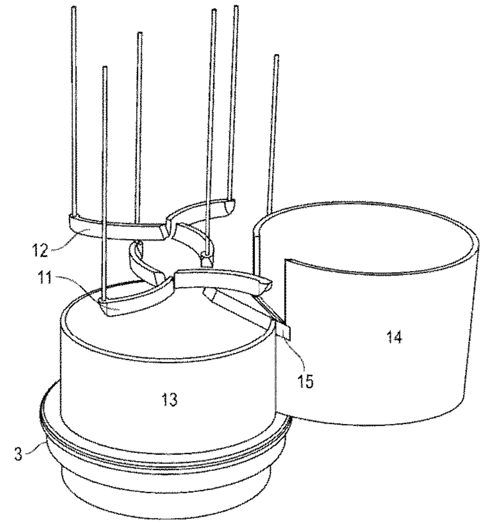
FIG. 5 depicts an exploded view of a cleaning and containment device in a closed configuration according to the third embodiment of the invention.

FIG. 5 depicts the device of FIG. 4 in an exploded view for clarity. The arcuate members 11, 12 of the two actuators rotate about respective first ends, and are axially translatable. In use, the two actuators take it in turns to act as the attachment means and the scooping actuator.

During a cycle of operation, the arcuate members 11 of the first actuator extend to enclose a first end of the disposable containment tube drawn from the store, and move into the first compartment 13 of the main body 1, thus forming an open chamber in the disposable containment tube within the first compartment. If this is the first chamber of the particular tube, its first end is tied or otherwise closed. A cleaning operation is then performed as in the previous embodiments, wherein the cleaning region is placed on a surface to be cleaned, and the arcuate members 12 of the second actuator extend, drawing more of the disposable containment tube from the store, scooping dirt into the chamber, and closing the chamber. The chamber is then sealed, for example by rotating the store 3.

The pivoting ramp device 15 then pivots, creating a bridge between the second compartment 14 and the first compartment 13. It scoops up the newly formed sealed separate chamber, as the first set of arcuate members 11 retracts, releasing the end of the chamber. The second set of arcuate members 12, still extended, then moves into the first chamber, pushing the sealed separate chamber farther into the second compartment 14, and drawing more of the disposable containment tube into the first compartment 13 from the store 3. The second set of arcuate members 12 then takes on the role of the attachment member for the next chamber formed of the disposable containment tube, while the first set of arcuate members 11 returns to the distal end of the rim and takes on the role of the scooping actuator for the next cleaning operation.

Figure 6:
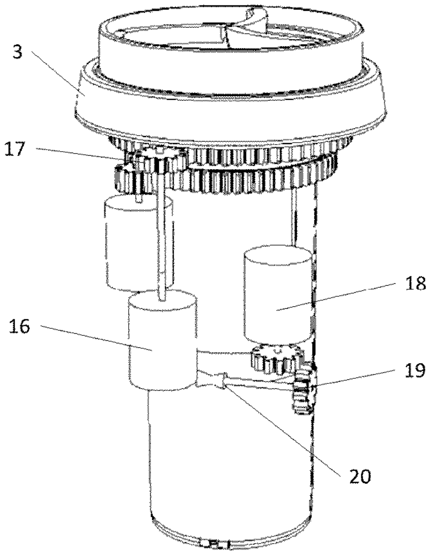
FIG. 6 depicts a cleaning and containment device according to the second embodiment with selected details of the mechanical driving system.

FIG. 6 shows details of an exemplary mechanical driving system which may be used to drive the device. A first motor 16 drives a gear system 17 to cause the rotation of the cassette 3 with respect to the main body of the device. This may be in direct response to a manual command, or in response to sensor data (for example, sensing that the device has been lifted slightly from the surface to be cleaned). Alternatively, it may be part of an automatic sequence initiated by a manual command, or in response to sensor data (for example, sensing that the device has been positioned on a surface to be cleaned).

A second motor 18 drives a second gearing system 19 which in turn rotates a spindle 20. The spindle has a wire wound around it, and spinning the spindle in a first direction causes the wire to be let out, while spinning the spindle in the second, opposite direction causes the wire to be reeled in. The wire is attached to the second actuator, and so when the spindle is spun in the first direction, the second actuator moves in the proximal direction. This may be in direct response to a manual command, or in response to sensor data. Alternatively, it may be part of an automatic sequence initiated by a manual command, or in response to sensor data (for example, sensing that the device has been positioned on a surface to be cleaned).

When the spindle is spun in the second direction, the second actuator moves in the distal direction. This may be in direct response to a manual command, or in response to sensor data (for example, sensing that disposable containment tube is full, the store is empty, or the device has been positioned proximate a waste disposal unit). Alternatively, it may be part of an automatic sequence initiated by a manual command, or in response to sensor data (for example, sensing that the device has been positioned on a surface to be cleaned for an nth time since the last length of tube was emptied from the main body).

Figure 7:
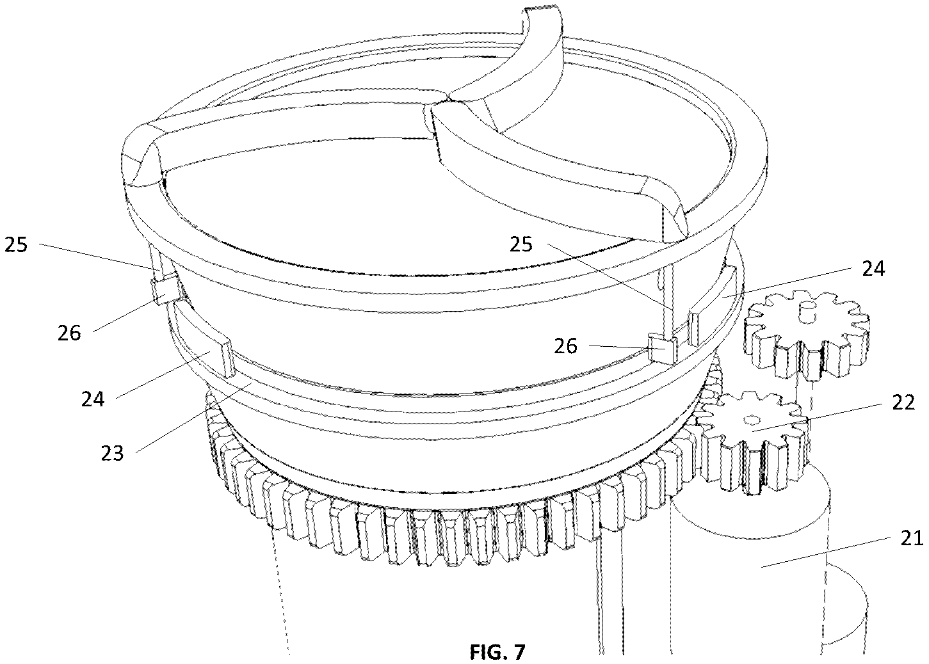
FIG. 7 depicts a detail of a cleaning and containment device according to the second embodiment with further details of the mechanical driving system.

FIG. 7 shows further details of an exemplary mechanical driving system which may be used to drive the device. A third motor 21 drives a third gear system 22, which causes an annular member 23 to rotate about the outside of the main body. Three protrusions 24 extend from the annular member 23. The three scooping members 5 of the first actuator pivot about respective first ends of three elongate pivot members 25. The second, opposite ends of the three elongate pivot member 25 are proximate the annular member 23 and have respective levers 26 attached. When the third motor 21 drives the third gear system 22 to rotate the annular member 23, this causes the protrusion 24 to push the levers 26 to rotate the elongate pivot members 25 to retract the scooping members 5 of the first actuator. The scooping members are resiliently biased in the extended position by a spring (not shown) about the extended pivot members 25.

The invention has been described by reference to a number of embodiments. These embodiments are not limiting. For example, although the invention has been described with reference to an embodiment comprising two flexible laterally translatable scooping actuators and an embodiment comprising three or six rotatable scooping actuators, other actuator formations could be selected. As an alternative to the third embodiment comprising six rotatable actuators, two cooperating pairs of flexible elongate laterally translatable actuators could be used. The scope of the invention is determined by the claims.

The invention claimed is:

1. A cleaning device comprising: a hollow main body (1) having a first end (2) and a second end, wherein the hollow body (1) defines a chamber between its first end (2) and its second end, and wherein the chamber has an opening at the first end (2), the opening having an edge and a centre, the edge of the opening defining a plane; a first actuator comprising a scooping member, wherein the first actuator is movable between an extended position and a retracted position, wherein when the first actuator is in the retracted position, substantially all of the scooping member is disposed proximate the edge of the chamber opening, and wherein when the first actuator is in the extended position, at least a part of the scooping member is disposed proximate the centre of the chamber opening; a second actuator, at least partly within the chamber, comprising a holding member (7), wherein the second actuator is movable; and a store (3) of disposable containment tube (10) material, from which, in use, disposable containment tube (10) material can be drawn by a pulling force exerted on an already exposed portion of the stored containment tube (10) material; wherein, the holding member (7) is configured to grip, in use, a portion of the disposable containment tube (10) material, wherein at least one of: a portion of the main body (1) proximate its first end (2); the first actuator; and/or the store (3) of disposable containment tube (10) material is rotatable with respect to the second actuator.

2. A cleaning device according to claim 1 wherein the first actuator comprises two extendable and retractable bridging members (6) attached at their proximal ends to opposing positions proximate the chamber opening, and the scooping member comprises two flexible elongate members (5) attached to respective distal ends of the bridging members (6).

3. A cleaning device according to claim 2, wherein when the first actuator is in the extended position, the two flexible elongate members (5) are held parallel and proximate to one another, their respective centres being held proximate to the centre of the chamber opening.

4. A cleaning device according to claim 2 or claim 3, wherein a rim (4) extends from the chamber opening, and wherein when the first actuator is in the retracted position, the two flexible elongate members (5) are held against the rim (4).

5. A cleaning device according to claim 1 wherein: the second actuator is movable in a proximal direction and in an opposite, distal direction, wherein the distal direction is from the second end to the first end (2), and the proximal direction is from the first end to the second end (2).

6. A cleaning device according to claim 1 wherein: the first actuator comprises three elongate scooping members having respective proximal ends and distal ends; and the proximal ends are rotatably connected proximate the edge of the chamber opening, spaced at substantially equal intervals, the axis of rotation being perpendicular to the plane defined by the chamber opening.

7. A cleaning device according to claim 6, wherein when the first actuator is in the extended position, the distal ends of the three scooping members are held proximate the centre of the chamber opening.

8. A cleaning device according to claim 6 wherein a rim (4) extends from the chamber opening, and when the first actuator is in the retracted position, the scooping members are held against the rim (4).

9. A cleaning device according to claim 1, wherein the store (3) of disposable containment tube (10) material is a cassette, replaceably attached to the outside of the main body (1).

10. A cleaning device according to claim 1 wherein the main body (1) is cylindrical.

11. A cleaning device according to claim 1 wherein the scooping member has a low friction distal face held substantially flush with the edge of the plane defined by the chamber opening.

12. A cleaning device according to claim 1 wherein the disposable containment tube (10) material is formed of a plurality of layers, the outer surface of the outermost layer being abrasive or high-friction.

13. A cleaning device according to claim 1 wherein the disposable containment tube (10) is divided into lengthwise sections, each section being closable and/or sealable at each end so as to form separate compartments within the tube.

14. A cleaning device according to claim 13 wherein the sections can be closed or sealed by means of one or more of: twisting; tying; heat activated adhesive; integral drawstring; integral elastomeric material.

15. A cleaning device according to claim 14 wherein the disposable containment tube (10) comprises a layer of polythene film bonded to a series of open ended tubes, spaced apart and at intervals along the length of the polythene film, wherein each of the open ended tubes comprises absorbent material of a non-woven viscose and polyester blend.

* * * * *